United States Patent [19]
Penn et al.

[11] 3,973,834
[45] Aug. 10, 1976

[54] MIRRORS HAVING STRETCHED REFLECTIVE SHEET MATERIALS AND METHOD AND APPARATUS FOR THEIR PRODUCTION

[75] Inventors: Franklin E. Penn, Darien, Conn.;
Walter B. Fletcher, Bedford, N.H.;
Edmund Rosa, Lowell, Mass.;
Joseph Perina, Huntington, N.Y.

[73] Assignee: American Velcro, Inc., New York, N.Y.

[22] Filed: Mar. 26, 1974

[21] Appl. No.: 455,024

[52] U.S. Cl. .................................... 350/310; 52/222
[51] Int. Cl.² ........................ G02B 5/08; E04B 1/00
[58] Field of Search ................ 350/288, 295, 310; 52/222; 248/467; 29/238

[56] References Cited
UNITED STATES PATENTS

| | | | |
|---|---|---|---|
| 3,608,179 | 9/1971 | Jeffree et al. | 350/310 |
| 3,623,796 | 11/1971 | Schweiger | 350/295 |

FOREIGN PATENTS OR APPLICATIONS

| | | | |
|---|---|---|---|
| 1,354,837 | 2/1964 | France | 350/310 |
| 316,378 | 4/1934 | Italy | 350/295 |

*Primary Examiner*—John K. Corbin
*Assistant Examiner*—Jon W. Henry
*Attorney, Agent, or Firm*—Pennie & Edmonds

[57] ABSTRACT

A planar mirror having a reflective surface of unusually superior quality formed by a metallized thin-film reflective sheet material in a stretched condition over a unitary frame having a raised integral peripheral ridge extending in an endless path therearound. The metallized thin-film sheet material is secured to the peripheral marginal portion of the frame on the forward side thereof thereby maintaining the stretched condition of the film over the peripheral ridge in a manner which provides uniform tensioning about the periphery of the ridge. A unique apparatus and an improved method of producing such mirrors is also disclosed.

16 Claims, 9 Drawing Figures

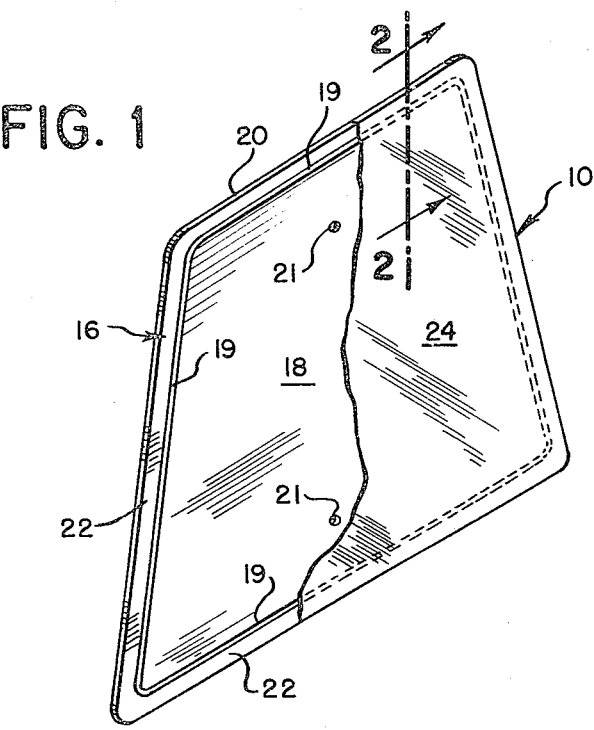
FIG. 1
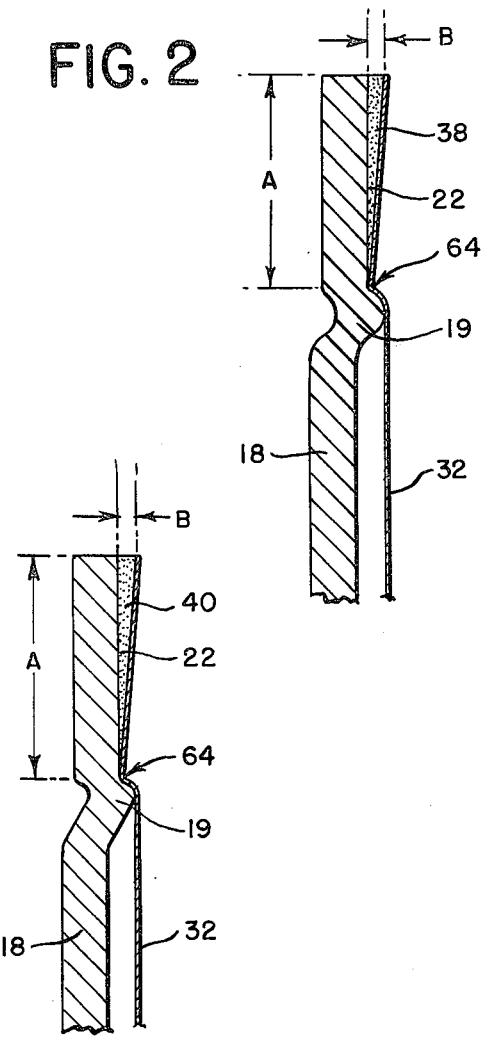
FIG. 2
FIG. 3
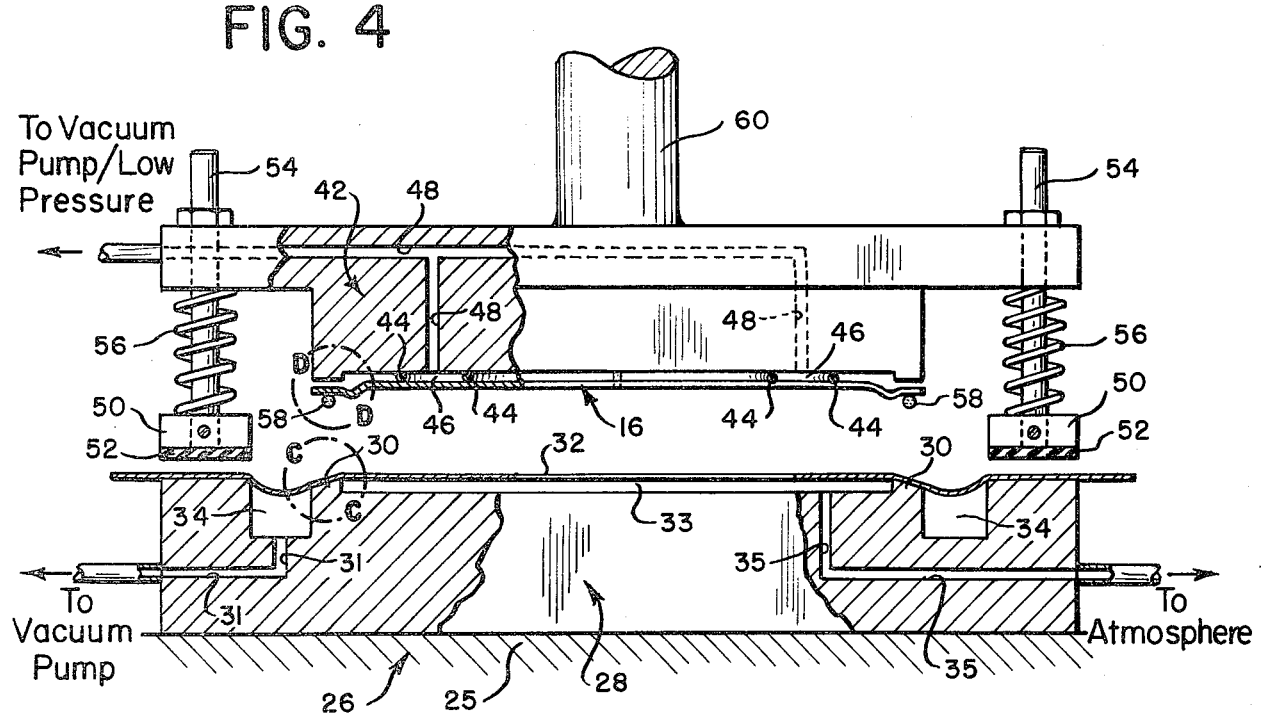
FIG. 4

MIRRORS HAVING STRETCHED REFLECTIVE SHEET MATERIALS AND METHOD AND APPARATUS FOR THEIR PRODUCTION

BACKGROUND OF THE INVENTION

1. Field of the Invention

This invention relates to improvements in mirrors having a reflecting surface provided by a metallized reflective sheet material, such as aluminized polyester, in a stretched condition over a supporting frame.

2. Description of the Prior Art

It has been generally known that lightweight planar mirrors can be produced by stretching over a generally peripheral ridge on a supporting frame, a thin flexible sheet material having a reflective surface. Examples of different constructions of such mirrors are found in various patents. For example, British Pat. No. 841,875 to General Electric Company Limited, London, relates to a reflector having a reflecting polymeric material attached to a base material. Other patents include U.S. Pat. No. 3,180,220 to Jeffree; U.S. Pat. No. 3,434,181 to Benzies; U.S. Pat. No. 3,552,835 to Benzies; U.S. Pat. No. 3,608,179 to Jeffree et al; and U.S. Pat. No. 3,687,524 to Martinez.

One of the most important features in the construction of these mirrors is to take extraordinary care that the frames are flat and true or else the stretched sheet material will give a distorted image. The portion of the frame over which the reflective sheet material is stretched must be extremely flat, coplanar, and continuous. Even minute irregularities in the upper surface portion of the generally peripheral ridge over which the sheet material is stretched results in magnified distortions in the mirror surface with a loss of optical accuracy. Minor inaccuracies in the frame construction or deflections in the frame due to compressive and bending forces caused by the stretched condition of the film results in great distortions in the mirror surface. For example, deviations up to 0.001 inch in coplanarity of the portion of the frame over which the film is stretched were found to be detrimental to the mirror quality.

In the past, the preferred construction of mirrors of this type has included extruded aluminum, generally inwardly open channel members defining a frame. The channel members surround and hold a lightweight reinforcing substrate member between upper and lower flange members of the channel. The frame is bent into the desired shape with the end portions fastened together, or it is mitered and welded at its corners with great care taken to obtain a true planar frame so that when the reflective film is stretched thereover, it is as flat as possible so that the optical correctness required to produce a relatively distortion-free image is realized.

Once the film is stretched over the bead and placed in tension, it produces severe bending and twisting forces on the frame. It is partially the function of the reinforcing substrate to alleviate these forces and distribute them as uniformly as possible along the frame. The substrate alone however, which generally has been of a rigid foam plastic material, does not provide the requisite reinforcements and does not facilitate production of an optically correct mirror. U.S. Pat. No. 3,733,116 to Hutchinson discloses a means of avoiding the difficulties of the prior art by introducing a resilient member between a flange of the channel members of the frame and the supporting substrate which — being in compression therebetween when the thin-film reflective sheet material is shrunk — provides a reinforcement in the frame and resulted in an improved optically correct mirror.

Notwithstanding the improvement of Hutchinson the disadvantages of the prior mirrors continue to be existent. Primarily because of their complexity and the meticulous care required in their production, frames are expensive to produce. Backing substrate members involve still additional expenses. Excessive handling often results in damaged optical surfaces. Gripping capability of the film holding means — usually an adhesive material, which, after curing, is quite rigid — is often not sufficient to develop the maximum film tension possible with the most uniform stress distribution. Also the relatively rigid adhesives utilized permit variations in film tension from point to point around the periphery of the mirror due to temperature and humidity changes while "creeping" of the bond often results in deterioration of the optical qualities of the mirror surface. Moreover adhesively securing the film to the rearward and/or side surfaces of the frames having multiple components did not readily facilitate pressure adhesive securing techniques.

We have invented a mirror in which an optically correct and accurate mirror surface is provided by a metallized thin-film reflective sheet material maintained in a stretched condition over a unitary frame having a raised peripheral ridge or bead. Moreover, we have developed a new and improved method of producing such mirrors, as well as a unique apparatus particularly for practicing the method, wherein the disadvantages of the prior art mirrors are substantially eliminated, and the optical mirror qualities are substantially increased.

SUMMARY OF THE INVENTION

Broadly stated, the invention relates to planar mirrors having a reflective surface of high quality formed by a metallized thin-film reflective sheet material in a stretched condition over a supporting frame. A unitary substantially flat frame member having a rearward side and a forward side, has a raised integral peripheral ridge extending upwardly from the forward side thereof and defines an endless path. The ridge is positioned inwardly from the peripheral edge of the frame so as to define a peripheral marginal portion which extends about the periphery of the frame outwardly of, and in adjacent relation to, the endless path defined by the ridge. A metallized thin-film reflective sheet material extends over the forward side of the frame and is maintained in a stretched condition across the frame portion defined by the peripheral ridge. The invention further comprises means for securing the sheet material over the peripheral ridge to the peripheral marginal portion on the forward side of the frame. The sheet material is maintained in a stretched condition over the frame portion such that the compressive and bending forces on the unitary frame member caused by the stretched condition of the thin-film reflective sheet material and the reaction forces of the frame are in balanced equilibrium thereby creating a continuous and optically correct reflecting mirror surface over the frame portion defined by the peripheral ridge. In the preferred embodiment an elastomeric adhesive is utilized to secure the film over the frame. Such adhesives are highly viscous and capable of forming a "skin" therearound when applied to the frame member for securing the thin-film material thereto. In addition, after curing, the elastic qualities of such adhesives permit local uniform tensioning of the thin-film sheet material from point to point about the periphery of the mirror frame.

Notwithstanding the advantages of such silicone-elastic adhesives, it has been found that still other adhesives having other than elastomeric properties have nevertheless been successfully utilized to produce mirrors having qualities superior to the mirrors of the prior art when utilized in combination with the present invention. Such adhesives are available in the form of tapes; liquids; emulsions; paste; simple or multiple adhesives; pressure sensitives; heat, air or moisture curing; or anaerobic materials.

A feature of the invention relates to the integral relation between the mirror frame and the peripheral ridge. The ridge may be formed (stamped) or machined from metallic or non-metallic substances. In the preferred form the mirror frame is comprised of an aluminum plate member having substantially flat-plate qualities, and a peripheral ridge formed integrally therewith defining an endless peripheral path which in turn defines the shape of the reflecting mirror surface. The peripheral ridge is preferably arcuate in cross-sectional configuration and defined by an "inner peripheral corner" and a "outer peripheral corner," each spaced from each other by the thickness of the ridge. These "corners" are best defined as the intersections between the external arcuate surface of the ridge and the upper surface of the flat frame member.

The optical quality of the mirror is largely dependent upon the coplanarity, uniformity and sharpness of the outer corner of the ridge. Depending upon the adhesive and its viscosity, the distance between the outer corner of the ridge and the outer periphery of the frame is significant in order to develop optimum bond strength consistent with a minimum waste of adhesive material. Further, since bond strength depends upon thickness of the adhesive, the thickness of the adhesive film must be controlled as will be seen from the description which follows.

The method of the present invention relates to the production of such planar mirrors having a reflective mirror surface comprising taking a flat frame member having a rearward side and a forward side and a raised peripheral ridge integral with the frame and extending upwardly from the forward side and defining an endless path about a peripheral portion of the frame inwardly of the peripheral edge thereof defining a peripheral marginal portion of the frame adjacent to, and outwardly of, the peripheral ridge. The method further comprises placing an adhesive material on the peripheral marginal portion of the frame between the peripheral ridge and the peripheral outer edge and supporting a metallized thin-film sheet material on a support member with the metallized side facing upwardly and securing the sheet material against the support member along peripheral portions of the support member. The method further comprises stretching the sheet material over the support member sufficient to remove major wrinkles therefrom and to maintain it in a flat condition and placing the frame with the ridge side of the frame in face-to-face relation with the metallized surface of the reflective sheet material while maintaining the material in a flat condition. The method further comprises applying pressure between the frame and the reflective sheet material while maintaining sufficient pressure between the film and outer corner of the peripheral ridge such that the adhesive material sufficiently wets the thin-film material and the entire peripheral marginal frame portion without wetting the uppermost portion of the peripheral ridge. The method further comprises curing the adhesive material and heating the thin-film sheet material sufficient to shrink the material over the peripheral ridge of the frame such that the compressive forces caused by the stretched film on the frame member are in balanced equilibrium with the compressive reaction forces of the unitary frame member thereby creating a cntinuous and optically correct reflecting mirror surface over the peripheral ridge.

The invention also relates to an apparatus for adhesively securing a metallized reflective sheet material to a peripheral marginal portion of a frame member over a peripheral raised ridge which extends over an endless path inwardly of the marginal portion such that upon subsequent heating of said material, the uniform shrinkage of the material will produce a reflective mirror surface of high optical quality over the frame member. The apparatus comprises a frame structure which supports a first stationary die having means for supporting a metallized thin-film sheet material thereacross. A second die is moveably supported on said frame structure above said first die and is provided with means for securing thereto a frame member having a raised peripheral ridge extending thereabout and facing downwardly toward the reflective sheet material, said frame member having a quantity of adhesive material dispensed along the peripheral marginal frame portion outwardly of the peripheral ridge. Means for moving the upper die toward the lower die while positioning the dies such that support portions of the lower die come in contacting relation with a frame member supported by the upper die with the metallized thin-film therebetween. The movement of the second die toward the first die is increased until the pressure between the support portion of the first die and the marginal peripheral portion of the frame is sufficient to cause the adhesive material to completely wet the surfaces between the peripheral marginal portion of the frame and the thin-film material.

A feature of the apparatus resides in the capability of applying and maintaining the pressure between the dies for a time sufficient to cause the adhesive material to bleed the air therebetween due to the pressure which must be controlled so as not to tear the film between the frame member and the thin-film. This results in a uniform effective adhesive joint such that upon the subsequent curing of the adhesive material and the application of heat to the thin-film sheet material sufficient to cause uniform shrinkage of the material, the compressive and bending forces caused by the shrunken film are in balanced equilibrium with the compressive and bending reaction forces of the frame member to thereby create a continuous and optically correct reflecting mirror surface over the portion of the frame defined by the peripheral ridge. In the preferred form the heat shrinking of the thin-film material is accomplished in a heat tunnel comprised of a polished mesh conveyor screen which transports the mirror under the heat of radiant heat source, such as an infrared heat source.

Still another feature of the apparatus relates to the careful control which is possible in the application of adhesive material to the forward side of the frame so as to capably control the quantity dispensed.

BRIEF DESCRIPTION OF THE DRAWINGS

Preferred embodiments of the invention are described hereinbelow with references to the drawings wherein:

FIG. 1 is a perspective view of a lightweight thin-film mirror with a portion cut away to show the preferred construction of the mirror of the present invention;

FIG. 2 is a cross-sectional view taken along line 2—2 of FIG. 1;

FIG. 3 is a cross-sectional view of an alternate frame of a mirror constructed according to the present invention;

FIG. 4 is a typical partial cross-sectional view of an apparatus of the present invention for securing a thin-film metallized sheet material to a mirror frame member (other cross-sections may differ in dimensions, but are substantially similar to that shown);

DETAILED DESCRIPTION OF THE PREFERRED EMBODIMENTS

In the following description the "upper" of "forward" side of the mirror or frame refers to the portion including the raised peripheral ridge over which a metallized sheet is stretched. The "lower" or "rearward" side refers to the rear surface of the mirror opposite the reflecting surface.

Figure 7:
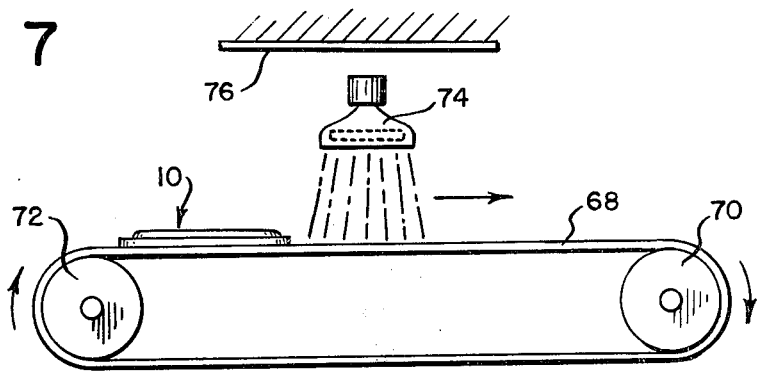
FIG. 7 is a partial cross-sectional view of a preferred heat shrinking apparatus according to the invention.
Figure 8:
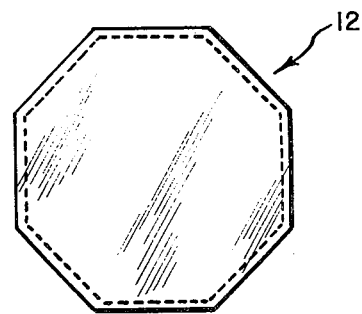
FIG. 8 is a plan view of an alternate embodiment of the mirror of the present invention.
Figure 9:
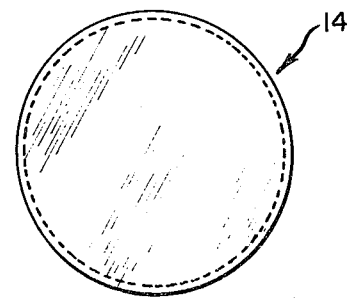
FIG. 9 is a plan view of still another embodiment of the mirror of the present invention.

Referring to the drawings, there is shown in FIG. 1 a thin-film mirror 10 of lightweight construction constructed according to the principles of the invention. The frame shown is configured in the shape of a polygon; i.e., having a plurality of sides. However it should be understood that the mirror may have any number of shapes such as triangular, rectangular, square, or other geometric shapes including circular, elliptical and the like. See, for example, the octagonal mirror 12 of FIG. 7 and the circular mirror 14 of FIG. 8.

The frame member is in the form of a unitary frame 16 shown in FIG. 1 which is preferably a flat plate-like member 18 having a peripheral ridge or bead 19 integrally therewith and extending along an endless path a predetermined distance inwardly of the outer peripheral edge 20 of the frame 16. The channel forming the ridge actually stiffens the plate. Therefore the inward position of the ridge forms a marginal peripheral surface portion 22 to which the metallized thin-film reflective sheet material is adhered and maintained in a stretched condition. Equalization apertures 21 facilitate equilization of atmospheric conditions on both sides of the film to maintain uniform tension in the film and to prevent fogging, etc.

The thin-film sheet material may be adhered to the forward peripheral marginal frame portion by any suitable adhesive. However it has been found that relatively viscous elastomeric adhesives having the capability of skinning — i.e., the property of forming a thin skin therearound upon being exposed to the atmosphere — are preferred due to their particular adaptability to the process of the invention and due to their capability to retain a degree of elasticity. This property assists in maintaining uniform tensioning of the film at all times. Examples of preferred adhesives contemplated by the present invention include 732 RTV general purpose adhesive/sealant marketed by Dow Corning Corp., Midland, Michigan under the Trade Mark SILASTIC.

The metallized thin-film sheet material 24, which is maintained in a stretched condition over the peripheral ridge of the frame, is preferably a polyester such as polyethylene terephthalate, having a vacuum deposited reflective layer of aluminum, silver, chromium and the like. The sheet material forms a smooth high quality reflecting mirror surface over the peripheral ridge of the frame. An example of polyethylene terephthalate thin-film sheet material contemplated by the invention is marketed by Imperial Chemical Industries, America and Imperial Chemical Industries Limited, under the Registered Trade Mark "Melinex," type "0," mirror grade. By heating such films to temperatures ranging from 180°C to say, 200°–210°C, they shrink to form an even uniform reflective mirror surface over the frame. In addition, polymides, which are known for their higher temperature resistance and their capability to be subjected to high temperatures without burning, may also be utilized for mirrors requiring high temperature exposure.

Referring now to FIG. 4, the unique method and apparatus 26 of the present invention will be described. While the dies to be described may be placed in any orientation, for convenience they will be referred to as a "lower die" and an "upper die." Frame 25 has stationarily secured thereto, lower die 28. Lower die 28 defines a peripheral film support 30 across which a sheet of metallized thin-film sheet material 32 is supported. A peripheral "exhaust ring" 34 surrounds the support 30 and is exhausted of air through openings 31 which lead to a vacuum pump (now shown), to provide a vacuum sufficient to provide tension to the film 32. The tension must be sufficient to remove major wrinkles therefrom and to maintain the film in a flat condition. The space 33 in lower die 28 defined by peripheral support 30 communicates with the atmosphere by openings 35.

Figure 5:
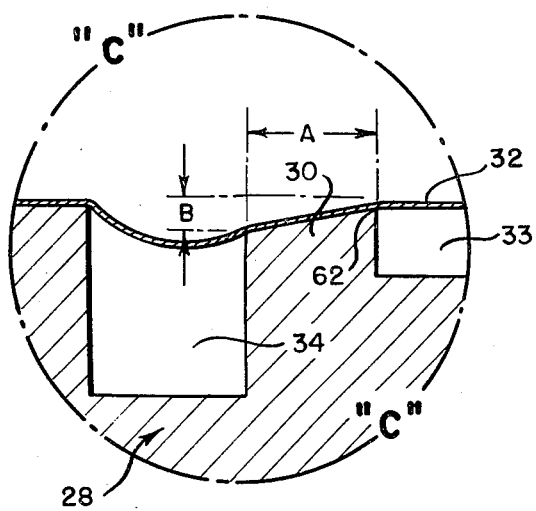
FIG. 5 is an enlarged cross-sectional view of the encircled portion identified as "C" of the lower die of FIG. 4.

Referring now to FIG. 5 there is shown an enlarged view of support 30. Support 30 is preferably equal in width (dimension A) to the width of the peripheral marginal portion 22 of frame 16 is FIG. 1. For example, for the preferred mirror shown in FIG. 1 dimension A is of the order of approximately 0.25 inch. The upper surface portion of support 30 preferably slopes downwardly and outwardly away from the upper die with the result that the adhesive 38, 40 has a triangular cross-section with a maximum thickness corresponding to dimension B. In the example stated, where dimension A is of the order of 0.25 inch, dimension B is preferably of the order of 0.015 inch. See FIGS. 2 and 3 respectively. Dimension B is approximately equal to the height of the ridge above the surface of marginal portion 22. Maintaining B at a minimum causes bond stress to be mainly shear as opposed to peel.

Referring once again to FIG. 4, mirror frame 16, of the type shown in FIG. 1, is held in position against upper die 42 by evacuated O rings 44 which define a peripheral space 46 therebetween communicating by openings 48 with a vacuum pump/low pressure source (not shown).

Metal supports 50 have resilient relatively soft gaskets 52 secured to the lower portions thereof and are slidably attached to upper die 42 by shafts 54 which permit relative vertical movement between die 42 and supports 50. Springs 56 provide a resilient connection between the supports 50 and the upper die 42.

The adhesive 58 is a silicone-elastic adhesive which is preferably dispensed along the peripheral marginal portion 22 of frame member 16 by a metering gun of a known type (not shown) which preferably has a controlled orifice and pressure and an adjustable plate feed which moves the plate linearly under the gun nozzle. The feed may be an endless belt while the gun may be of a known type which is either hydraulically or peumatically operated. The combination of the adjustable speed belt and the adjustable pressure on the gun, combined with the proper nozzle size, permits a controlled amount of adhesive to be applied to the frame member. The precise location of the adhesive bead 58 in relation to the height of the raised peripheral ridge 19 and the width of the peripheral marginal frame portion 22, is important since it is imperative that no adhesive comes into contact with the top of the ridge 19 and that an optimum quantity of adhesive wets the surfaces to be adhered and forms an optimum joint while fully bleeding any air entrapped therebetween. The precise optimum location of the adhesive bead 58 is thus dependent upon the size and configuration of each frame member 16.

In operation, frame member 16, having an adhesive bead 58 along the peripheral marginal portion 22 is secured in position to upper die (or press) 42 by the vacuum drawn through evacuated "O rings" 44. A sheet of metallized thin-film material 32 is positioned over lower die 28. Upper die 42 is then moved downwardly toward lower die 28. Initial contact is made by gasket 52 which presses the film against the lower die 28. Once firm contact is established, a pneumatic switch (not shown) on the ram 60 applies a vacuum to exhaust ring 34 which is sufficient to remove major wrinkles (if any) from the film and to maintain it in a flat condition over the lower die 28.

As the upper die 42 moves further downwardly, the high edge (or plateau) 62 of the lower die contact the outer peripheral corner 64 of frame 16. It will be seen that it is important that the peripheral corner 64 must be maintained as sharp as possible and as coplanar as possible about the periphery of the raised ridge 19. In addition this corner must have a cross-sectional configuration which corresponds to the plateau 62 of die 28 such that upon coming together in contacting relation, a firm contact is established between plateau 62 and corner 64. The adhesive is thus prevented from flowing inwardly over the ridge 19. As the upper die 42 continues its downward movement further, the adhesive is placed under pressure and any skin formed therearound is broken. The adhesive is thus placed under pressure and flows inwardly to corner 64 and outwardly discharging any air which may be entrapped therein while causing the adhesive to completely wet the film and peripheral margin of the frame. Any excess adhesive is squeezed out between the film and the frame in the form of a flash leaving a controlled thickness in the joint formed thereby as can clearly be seen in the drawings. Thus, by carefully controlling the adhesive application it is possible to secure the thin-film on a forward portion of the frame while maintaining the tension thereof around the curvature of the peripheral ridge. By controlling the configuration of the dies the adhesive material is increased in thickness from the ridge toward the peripheral edge of the frame. The result is a preferred adhesive joint of triangular cross-section with dimension A in FIGS. 2 and 3 corresponding to dimension A in FIG. 5 and dimension B in FIGS. 2 and 3 corresponding to dimension B in FIG. 5. This triangular configuration serves to maintain the strength of the bond notwithstanding the fact that a minimum amount of adhesive is applied at the apex of the triangular joint and increases outward of the peripheral ridge.

The pressure is maintained during a time period required to at least sufficiently wet the surfaces. It has been found that a pressure of approximately 80 psi (lbs. per square inch) applied to the ram 60 will produce an extremely effective adhesive joint with dimension A in FIGS. 2 and 3 being approximately 0.25 inch and dimension B approximately 0.015 inch. For particular applications, the viscosity of the adhesive, the dimension of the adhesive bead 58 and the dimensions of the frame are significant in determining the time required to sufficiently wet the surfaces.

At the end of the downward stroke the vacuum holding the frame member through openings 48 in upper die 42 is broken by another pneumatic switch (not shown) and replaced by a slight positive pressure applied to the rearward portion of the frame to prevent it from accidentally adhering to the upper die 42 when the ram is retracted. At approximately the same time the vacuum in the lower die 28 is released. The viscosity of the adhesive is sufficient at this point in the process that the mirror may be removed from the press by utilizing a vacuum cup (not shown) and placed on a rack to cure.

Figure 6:
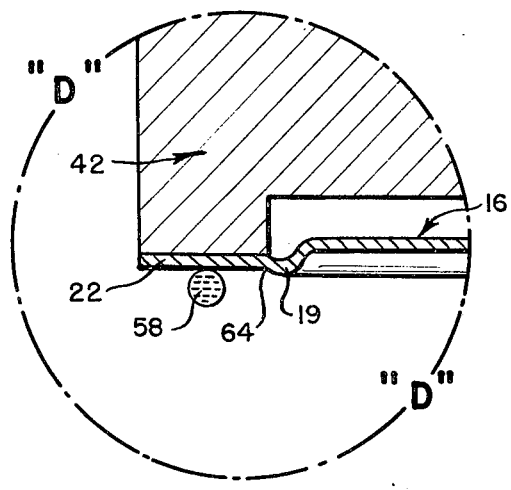
FIG. 6 is an enlarged cross-sectional view of the encircled portion identified as D of the upper die of FIG. 4.

The time period generally required for completely curing the adhesive is approximately 12 to 24 hours. When the adhesive has been completely cured the final reflecting mirror surface is produced by heat shrinking the metallized thin-film. In the preferred process the frame is passed under the radiation zone of an infra-red source such as infra-red lamp 24 by conveying it on mesh conveyor belt 68 as shown in FIG. 6. It is significant to control the distance between the lamp and the thin-film as well as the lamp wattage and the linear speed at which the mirror moves under the lamp so as to optimize the heat shrinking of the film to produce a uniform shrinkage. A backing reflector 76 having a reflecting surface assists somewhat in intensifying and localizing the heat transmitted to the film. However in some infra-red sources the reflection may be built integrally with the source.

The resulting mirror has superior optical qualities due to the even distribution in film tension over the surface. The use of the elastomeric cement as has been described, actually results in yielding of the cement at points of high stress with the effect that the film tension is always uniform notwithstanding variations in atmosphere conditions and the like. Since uniform film tension is a prerequisite to a superior reflecting surface of high optical quality, the resulting mirror has been found to have optical qualities which were not available in such thin-film mirrors of the prior art.

We claim:

1. A planar mirror having a reflective surface formed by a metallized thin-film reflective sheet material in a stretched condition over a supporting frame consisting of:
- a. a unitary frame member having a rearward side portion and a forward side portion;
- b. a raised integral peripheral ridge extending upwardly from the forward side portion thereof and defining an endless path, said ridge being positioned inwardly of the peripheral edge portion of said frame member so as to define a forward substantially flat peripheral marginal surface portion generally parallel to the frame portion surrounded by the peripheral ridge and extending about said frame member outwardly of, and in adjacent relation to said endless peripheral ridge;
- c. a metallized thin-film reflective sheet material positioned over the forward side portion of the frame member and extending at least to peripheral edge portions thereof, at least a portion of said material being in a stretched condition across the frame portion defined by the peripheral ridge to thereby form a reflective mirror surface; and
- d. an elastomeric adhesive material positioned between the reflective thin-film sheet material and the forward peripheral marginal surface portion and extending from said peripheral ridge at least to said peripheral edge portion of said frame member and having a thickness at the peripheral edge portion greater than the thickness at the peripheral ridge so as to maintain the stretched condition of the reflective thin-film sheet material with substantially uniformly distributed stresses therein being maintained in balanced equilibrium with reaction forces of the unitary frame member thereby creating a generally continuous and optically correct reflecting mirror surface at least over the frame portion defined by the peripheral ridge, while the elastomeric properties of said adhesive material permit expansion and contraction of the frame member and thin-film sheet material without substantial distortion of the reflecting mirror surface.

2. The mirror according to claim 1 wherein at least the portion of said frame member within said peripheral ridge is substantially flat and said peripheral ridge has an arcuate cross-sectional configuration.

3. The mirror according to claim 2 wherein the means for securing the metallized thin-film sheet material to the peripheral marginal portion on the forward side of the frame comprises a cured elastomeric adhesive material.

4. The mirror according to claim 3 wherein said cured adhesive material comprises a silicone-elastomeric adhesive material.

5. The mirror according to claim 4 wherein said cured adhesive material has a substantially right triangular cross-sectional configuration having an apex at the outer corner portion defined by the intersection between the outer surface portion of the peripheral ridge and the forward peripheral marginal surface portion of the frame member, the longest leg of said right triangular configuration being substantially equal to the width of the peripheral marginal surface portion of the frame member.

6. The mirror according to claim 5 wherein said frame member comprises an aluminum generally flat-plate member having a peripheral ridge formed integrally therewith and defining an endless path spaced inwardly from the periphery of the frame member a distance substantially equal to the width of the peripheral marginal surface portion of the frame member.

7. The mirror according to claim 6 wherein said metallized thin-film reflective sheet material comprises an aluminized polyester sheet material.

8. The mirror according to claim 7 wherein said polyester comprises polyethylene terephthalate.

9. The mirror according to claim 8 wherein said endless path defined by said raised peripheral ridge is in the shape of a polygon.

10. The mirror according to claim 8 wherein said endless path defined by said raised peripheral ridge is circular.

11. A planar mirror having a reflective surface formed by a metallized thin-film reflective sheet material in a stretched condition over a supporting frame comprising:
- a. a unitary frame member having a rearward side portion and a forward side portion;
- b. a raised integral peripheral ridge extending upwardly from the forward side portion and defining an endless path, said ridge surrounding a generally flat portion of the frame member and having a generally arcuate cross-sectional configuration and being positioned inwardly of the edge of the frame member to define a peripheral marginal surface portion extending about the periphery of the forward side portion of the frame member;
- c. a metallized thin-film reflective sheet material positioned over the forward side portion of said frame, at least a portion of said material being in a stretched condition across the frame portion defined by said peripheral ridge to thereby form a reflective mirror surface; and
- d. a silicone-elastomeric adhesive material positioned between said peripheral marginal portion on the forward side of said frame and said metallized thin-film reflective sheet material portion extending thereover to secure said sheet material to said peripheral marginal surface portion and to maintain the portion of the sheet material extending over said endless peripheral ridge in a stretched condition, said adhesive material being in a substantially cured condition and having a substantially right triangular cross-sectional configuration having an apex at the outer corner portion defined by the intersection between the outer surface portion of the peripheral ridge and the forward peripheral marginal surface portion, the longest leg being substantially equal to the width of the marginal surface portion of the frame member so as to maintain the stretched condition of the reflective thin-film sheet material and the compressive and bending forces on said unitary frame member caused by the stretched condition of the thin-film reflective sheet material and the reaction forces of said unitary frame member are in balanced equilibrium thereby creating a substantially continuous and generally optically correct reflecting mirror surface over the frame portion defined by said peripheral ridge.

12. The mirror according to claim 11 wherein said frame member comprises an aluminum generally flat-plate member having a peripheral ridge formed integrally therewith and defining an endless path spaced inwardly from the periphery of the frame member a distance which defines the width of the peripheral marginal surface portion of the frame member.

13. The mirror according to claim 12 wherein said metallized thin-film reflective sheet material comprises a aluminized polyester sheet material.

14. The mirror according to claim 13 wherein said polyester comprises polyethylene terephthalate.

15. The mirror according to claim 14 wherein said endless path defined by said raised peripheral ridge is in the shape of a polygon.

16. The mirror according to claim 14 wherein said endless path defined by said raised peripheral ridge is circular.

* * * * *